(12) United States Patent
Spinazze et al.

(10) Patent No.: US 9,126,698 B2
(45) Date of Patent: Sep. 8, 2015

(54) AIRCRAFT ENGINE STAND

(71) Applicant: Tronair, Inc., Holland, OH (US)

(72) Inventors: Paul Spinazze, Toledo, OH (US); Sherry Drake, Toledo, OH (US)

(73) Assignee: Tronair, Inc., Holland, OH (US)

( * ) Notice: Subject to any disclaimer, the term of this patent is extended or adjusted under 35 U.S.C. 154(b) by 270 days.

(21) Appl. No.: 13/969,681

(22) Filed: Aug. 19, 2013

(65) Prior Publication Data

US 2014/0061559 A1 Mar. 6, 2014

Related U.S. Application Data

(60) Provisional application No. 61/695,537, filed on Aug. 31, 2012.

(51) Int. Cl.
| | |
|---|---|
| B66F 3/08 | (2006.01) |
| B64F 5/00 | (2006.01) |
| B66F 5/00 | (2006.01) |
| B66F 11/00 | (2006.01) |

(52) U.S. Cl.
CPC ............... B64F 5/0036 (2013.01); B66F 5/00 (2013.01); B66F 11/00 (2013.01)

(58) Field of Classification Search
USPC .......................................................... 254/7 R
See application file for complete search history.

(56) References Cited

U.S. PATENT DOCUMENTS

| | | | | |
|---|---|---|---|---|
| 1,101,598 A * | 6/1914 | Weinke | ........................ | 187/267 |
| 2,514,563 A * | 7/1950 | Todd | ........................... | 187/233 |
| 2,712,874 A * | 7/1955 | Murray | ........................ | 414/743 |
| 2,825,477 A * | 3/1958 | Ross | .............................. | 29/559 |
| 3,424,474 A * | 1/1969 | Karnow et al. | .............. | 280/79.2 |
| 3,524,556 A * | 8/1970 | Miller | .......................... | 414/589 |
| 4,461,455 A | 7/1984 | Mills et al. | | |
| 4,502,568 A * | 3/1985 | Lebre | .......................... | 187/231 |
| 4,599,033 A * | 7/1986 | Raz | ................................ | 414/589 |
| 4,854,422 A * | 8/1989 | Kawada et al. | .............. | 187/231 |
| 4,987,976 A * | 1/1991 | Daugherty | .................... | 187/243 |
| 5,328,153 A | 7/1994 | Levinson | | |
| 5,820,330 A * | 10/1998 | Focke et al. | .................. | 414/427 |
| 5,848,668 A | 12/1998 | Kafrissen et al. | | |
| 6,379,107 B1 * | 4/2002 | Iwasaki et al. | ............... | 414/809 |
| 6,485,247 B1 * | 11/2002 | Groves et al. | ................ | 414/589 |
| 6,546,616 B2 * | 4/2003 | Radowick | ....................... | 29/720 |
| 6,551,050 B1 * | 4/2003 | Kallevig et al. | .............. | 414/607 |
| 6,979,288 B2 * | 12/2005 | Hazlehurst et al. | .............. | 483/1 |
| 7,101,139 B1 * | 9/2006 | Benedict | ....................... | 414/281 |
| 7,103,952 B2 | 9/2006 | Appleton et al. | | |
| 7,175,168 B2 * | 2/2007 | Hardaker et al. | ............... | 269/17 |
| 7,343,995 B2 * | 3/2008 | Fukuhara et al. | ............ | 180/168 |
| 7,347,409 B2 | 3/2008 | Goza | | |
| 7,980,808 B2 * | 7/2011 | Chilson et al. | ............... | 414/809 |
| 8,075,243 B2 * | 12/2011 | Chilson et al. | ............... | 414/809 |
| 8,210,791 B2 * | 7/2012 | Chilson et al. | ............... | 414/809 |
| 8,684,654 B2 * | 4/2014 | Bardin | .......................... | 414/427 |
| 9,014,836 B2 * | 4/2015 | Stone et al. | .................... | 700/114 |
| 2005/0244259 A1 * | 11/2005 | Chilson et al. | ................ | 414/664 |

* cited by examiner

*Primary Examiner* — Lee D Wilson
*Assistant Examiner* — Alvin Grant
(74) *Attorney, Agent, or Firm* — Emch, Schaffer, Schaub & Porcello Co., LPA

(57) ABSTRACT

This mobile, aircraft engine stand provides mobility and ease of operation by one person. The stand includes a frame, a pair of vertical jack screws vertically mounted on the frame and a precision rail system configured to allow for stable and efficient linear motion. A pair of quick change, engine lifting arms are attached to the pair of vertical jack screws; and an electrical control and control panel make unloading, transporting, assembling and moving an engine a one person operation. A plurality of casters allows for easy swiveling of the stand.

12 Claims, 6 Drawing Sheets

AIRCRAFT ENGINE STAND

CROSS REFERENCE TO RELATED APPLICATION

Figure 1:
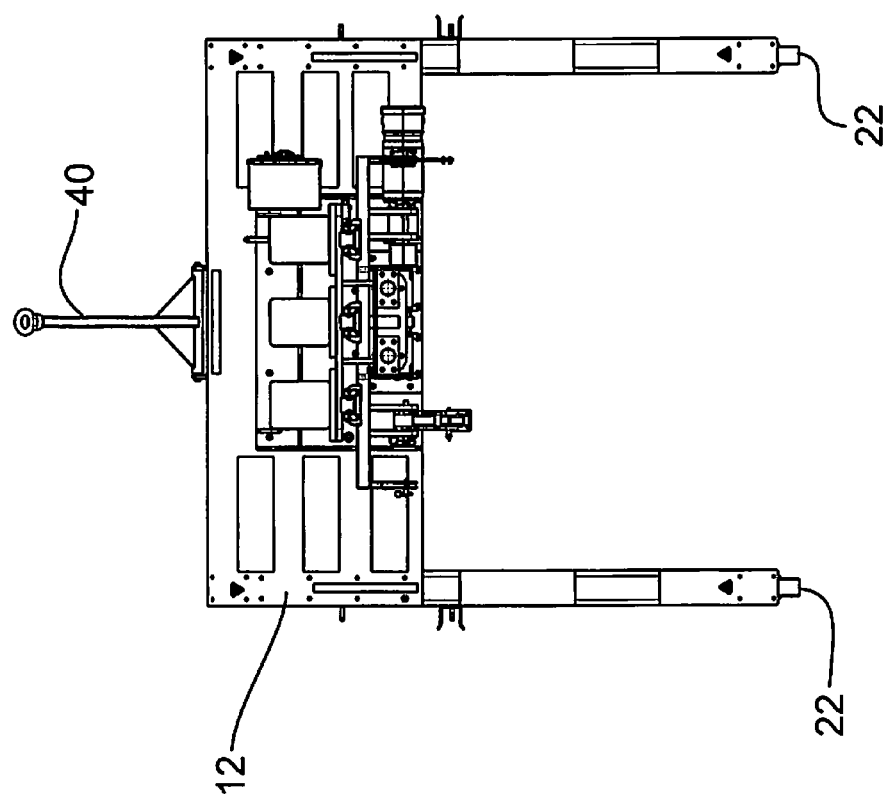

The present patent application is based upon and claims the benefit of provisional patent application No. 61/695,537, filed on Aug. 31, 2012.

FIELD OF THE INVENTION

The present invention relates to the field of aviation and, more particularly, to the maintenance and manufacture of aircraft. Specifically, the invention is a mobile engine lift stand.

BACKGROUND OF THE INVENTION

The handling of aircraft engines presents a significant challenge. For example, during manufacturing engines must be positioned precisely with respect to the aircraft airframe during the attachment process. Similarly, aircraft engines must be periodically removed for servicing and maintenance.

Desirable results have been achieved using existing engine stands. However, room for improvement exists. Mobility of the aircraft engine stand has not always been addressed. Nor do existing stands enable ease of operation by one person.

The present invention is based on the technical problem of addressing mobility and handling of the engine.

SUMMARY OF THE INVENTION

The present invention provides a mobile engine lift stand, designed to minimize the handling of an engine in the manufacturing process. The mobile stand allows customers to unload a core undressed engine from a truck or rail and mount it on the stand. The stand and engine then can be towed or moved under hand power down an assembly line or through an assembly cell. After the engine is built up, or dressed, it then can be moved to the assembly line where it can be mounted onto the aircraft via a crane or lifting device and engine sling.

Specifically, the mobile, aircraft engine stand comprises: a frame, a pair of vertical jack screws vertically mounted on the frame and coupled together to provide fine precision control in a vertical direction under a load at any speed; and a precision rail system configured to allow for stable and linear motion guidance under variable speeds and high load conditions keeping an engine in correct locations. A pair of quick change, engine lifting arms are attached to the pair of vertical jack screws; and an electrical control and control panel is configured to make unloading, transporting, assembling and moving an engine a one person operation. Also a plurality of lockable casters are attached to the frame configured to allow for easy swiveling.

Other objects and advantages of the present invention will become apparent to those skilled in the art upon a review of the following detailed description of the preferred embodiments and the accompanying drawings.

IN THE DRAWINGS

Figure 2:
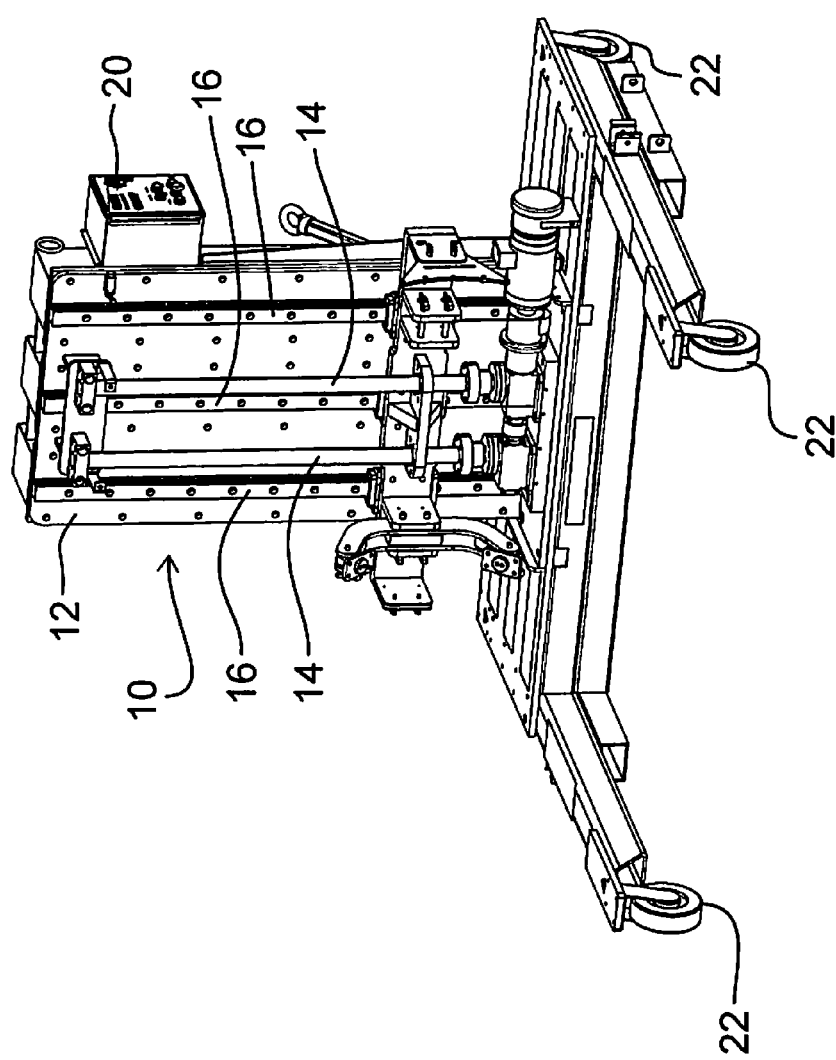
Figure 3:
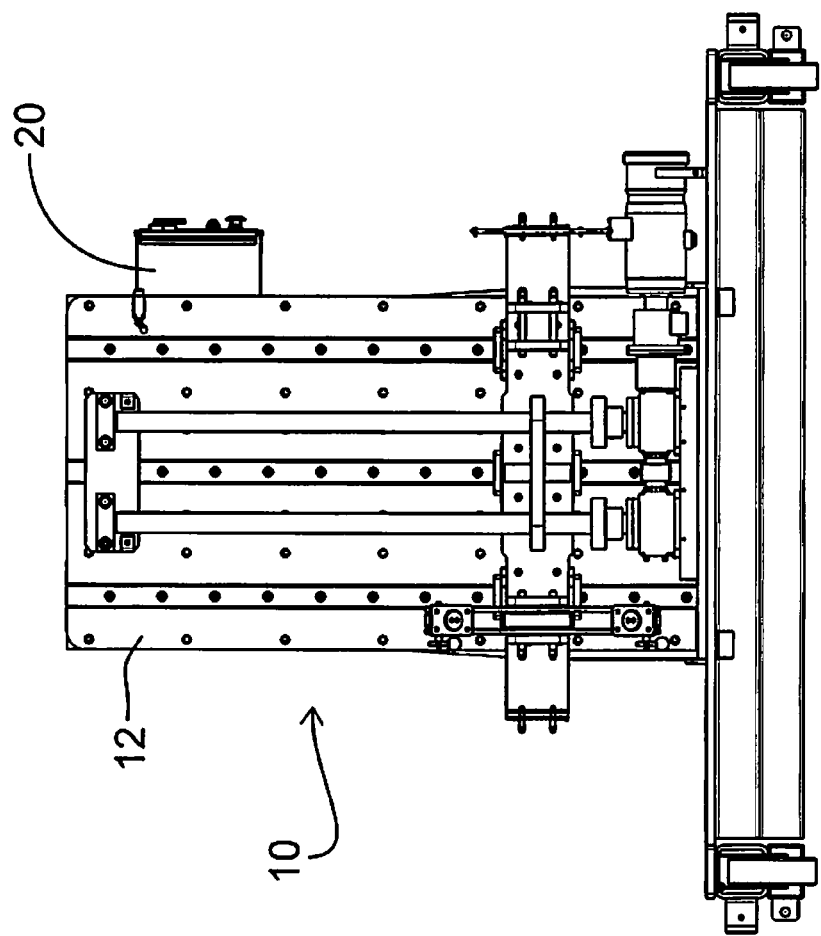
Figure 4:
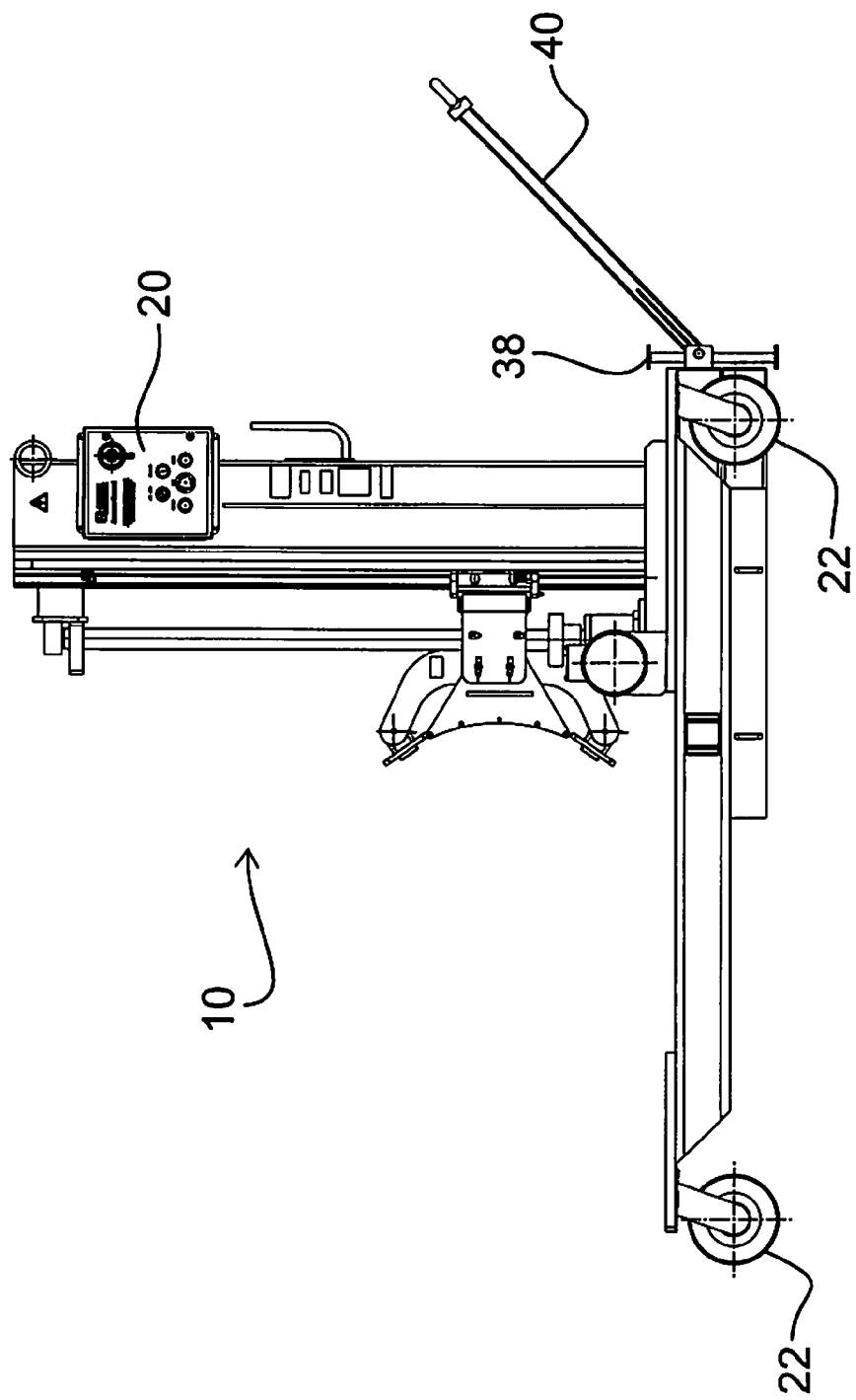
Figure 5:
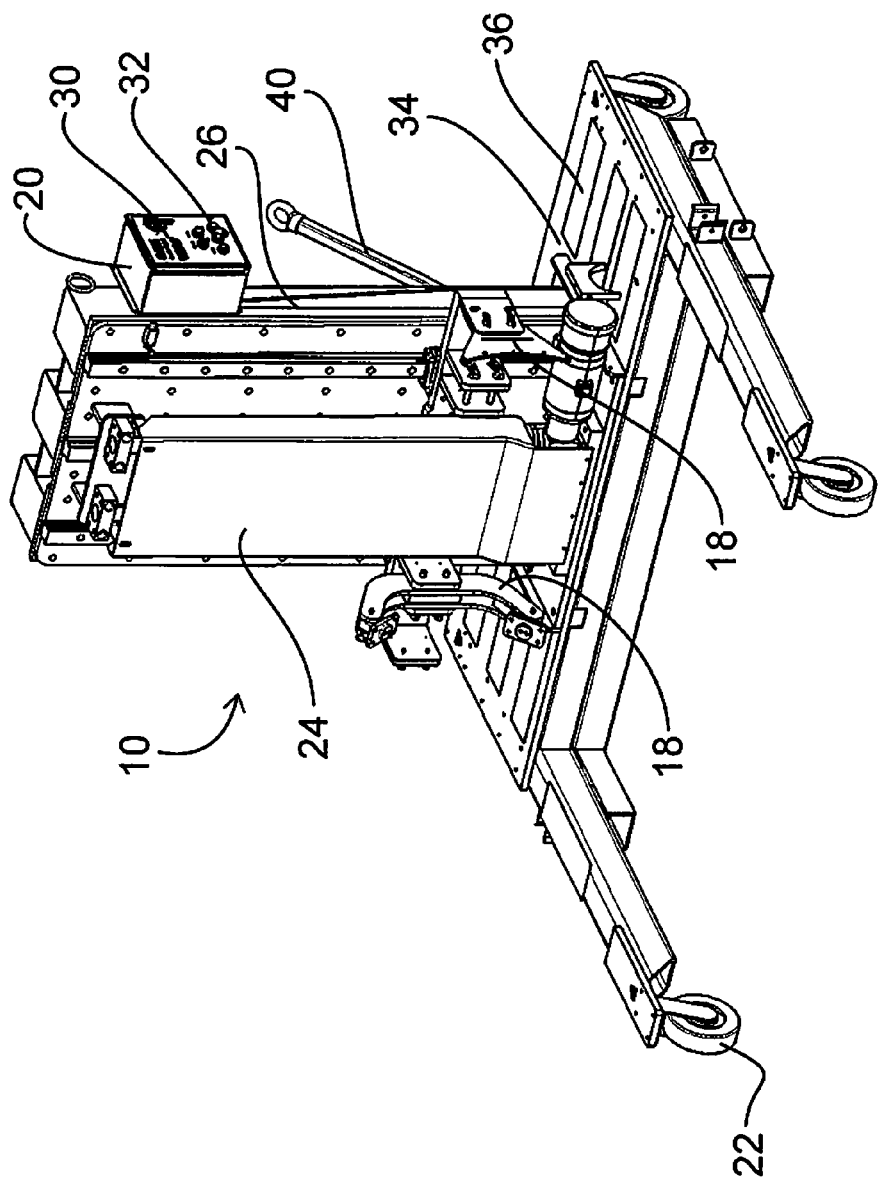
Figure 6:
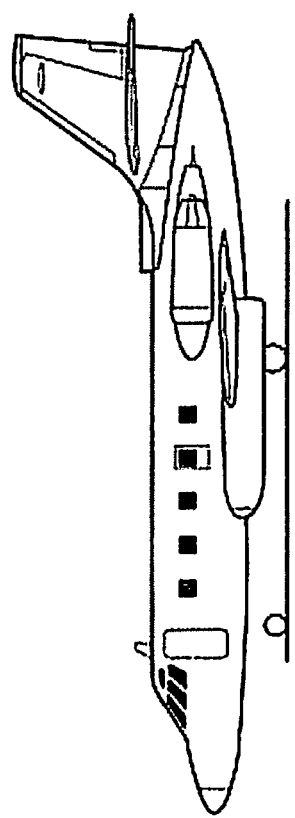

FIG. 1 is a top view of the engine stand of this invention.
FIG. 2 is a perspective view of the engine stand of this invention.
FIG. 3 is a back view of the engine stand of this invention.
FIG. 4 is a side view of the engine stand of this invention.
FIG. 5 is a view showing a transparent safety enclosure on the engine stand.
FIG. 6 is a general view showing a typical aircraft.

DETAILED DESCRIPTION OF THE INVENTION

FIGS. 1-5 show the major operating components of this invention. The following components provide mobility as well as ease of operation by one person for mobile aircraft engine stand 10.

Major Operating Components:

Jack Screws 14: The dual jack screw design is electrically driven and are coupled together to provide fine precision control in the vertical direction under a load at variable speeds. Precision control 20 allows the operator to locate the engine from 31" to 73" in the most efficient and ergonomic build up position.

Precision Rails 16: Precision rail system 16 allows for stable and efficient linear motion guidance under variable speeds and high load conditions keeping the engine in the correct location. Both jack screws 14 and precision rails 16 have a transparent safety enclosure 24 to prevent access to any moving parts.

Control Panel 20: Control panel 20 operates off a standard 120V, single phase, 30 Amp power cord 26 and has a main disconnect switch 30 with up and down pushbuttons and an emergency stop button 32. The electrification of this stand makes unloading, transporting, assembling and moving the engine a one person operation.

Engine Lifting Arms 18: Engine lifting arms 18 are designed to accommodate any engine weighing less than 2,000 pounds. The custom adaptors are manufactured of high strength materials to ensure the engine is secure. The quick change lifting arms can be used with either right or left side engines.

Working Deck 34: Working deck 34 allows the engine technician to have access to the rear of the engine and easy access to control panel 20. It is covered in non-slip adhesive 36 to ensure a safe working space.

Casters 22: The 10" swivel casters 22 are designed and manufactured from high quality, heat treated AISI 10345 stamped steel and they are zinc plated for corrosion resistance. The 3" wide casters are rated for 4,100 pounds each and the precision ball bearings allow for easy swiveling. Once the stand is located in place a floor lock is engage to ensure the stand will not move.

Towbar 40: Towbar 40 is 42" long and can be installed on 3 sides to allow for the most efficient transportation.

FIG. 6 is a general view showing a typical aircraft. Engine stand 10 of this invention is used to mount an engine on such an aircraft.

EXAMPLE

Operating Instructions:
1. Remove engine from shipping container with sling.
2. Secure engine adapters on engine.
3. Lift engine and mount on engine lifting arms.
4. Pin engine to lifting mounts.
5. Plug unit into nearest outlet.
6. Lower engine to lowest position for transportation on stand.
7. Unplug unit.
8. Move engine stand with towbar and vehicle.
9. Once in assembly location engage foot lock and lock casters so stand does not move.
10. Plug unit into nearest outlet.

11. Raise and lower stand so engine as required for engine assembly.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A mobile, aircraft engine stand (10) comprising:
   a frame (12);
   a pair of vertical jack screws (14) vertically mounted on the frame and coupled together to provide fine precision control in a vertical direction under a load at any speed;
   a precision rail system (16) configured to allow for stable and efficient linear motion guidance under variable speeds and high load conditions keeping an engine in a correct location;
   a pair of quick change, engine lifting arms (18) attached to the pair of vertical jack screws;
   an electrical control and control panel (20) configured to make unloading, transporting, assembling and moving an engine a one person operation; and
   a plurality of casters (22) attached to the frame configured to allow for easy swiveling.

2. An engine stand according to claim 1 wherein the engine lifting arms (18) are manufactured of high strength materials to ensure that an engine is secure.

3. An engine stand according to claim 1 wherein the lifting arms (18) can be used with either right or left side engines of an aircraft.

4. An engine stand according to claim 1 further comprising a transparent safety enclosure (24) enclosing both the jack screws (14) to prevent access to any moving parts.

5. An engine stand according to claim 1 wherein the control panel (20) further comprises a standard 120V, single phase, 30 Amp power cord (26).

6. An engine stand according to claim 1 wherein the control panel (20) further comprises a main disconnect switch (30) with up and down pushbuttons and an emergency stop button (32).

7. An engine stand according to claim 1 further comprising a working deck (34) on the frame (12) configured to allow access to the rear of the engine and to the control panel.

8. An engine stand according to claim 7 further comprising a non-slip cover (36) on an upper surface of the working deck.

9. An engine stand according to claim 1 wherein the casters (22) are manufactured from high quality, heat treated AISI 1045 stamped steel that are zinc plated for corrosion resistance.

10. An engine stand according to claim 1 wherein the casters (22) are rated for 4,100 pounds each and include precision ball bearings.

11. An engine stand according to claim 1 further comprising a floor lock (38) to ensure the stand will not move when engaged.

12. An engine stand according to claim 1 further comprising a towbar (40) attached to the frame.

\* \* \* \* \*